United States Patent [19]

Leineweber et al.

[11] Patent Number: 4,697,497
[45] Date of Patent: Oct. 6, 1987

[54] HYDRAULIC AMPLIFIER VALVE ASSEMBLY

[75] Inventors: Günter Leineweber; Rolf Warnecke, both of Gifhorn, Fed. Rep. of Germany

[73] Assignee: Volkswagen Aktiengesellschaft, Wolfsburg, Fed. Rep. of Germany

[21] Appl. No.: 805,705

[22] Filed: Dec. 6, 1985

[30] Foreign Application Priority Data

Dec. 7, 1984 [DE] Fed. Rep. of Germany ....... 3444614

[51] Int. Cl.⁴ ........................ F15B 9/10; F15B 11/08; B60T 13/00; B60T 13/20
[52] U.S. Cl. ..................................... 91/372; 91/422; 60/547.1; 60/554; 137/625.69
[58] Field of Search ............ 60/547.1, 548, 552, 60/554; 91/216 A, 222, 368, 422, 372; 137/625.25, 625.69; 251/175

[56] References Cited

U.S. PATENT DOCUMENTS

| Re 30,663 | 6/1981 | Schnitzius | 92/5 R X |
|---|---|---|---|
| 3,075,499 | 1/1963 | Prather | 60/547.1 X |
| 3,793,829 | 2/1974 | Swanson | 60/547.1 |
| 3,886,746 | 6/1975 | Farr | 60/547.1 |
| 3,977,193 | 8/1976 | Hayashida et al. | 60/547.1 |
| 4,227,371 | 10/1980 | Takeuchi | 60/547.1 |
| 4,379,423 | 4/1983 | Leineweber at al. | 60/552 X |
| 4,516,470 | 5/1985 | Warnecke et al. | 91/374 |
| 4,548,037 | 10/1985 | Farr | 60/552 |
| 4,638,719 | 1/1987 | Leineweber et al. | 251/175 X |

FOREIGN PATENT DOCUMENTS 3037218 5/1982 Fed. Rep. of Germany .

Primary Examiner—Robert E. Garrett
Assistant Examiner—George Kapsalas
Attorney, Agent, or Firm—Spencer & Frank

[57] ABSTRACT

A hydraulic amplifier valve assembly having an input end (where, for example, a brake pedal force may be applied) and an ouput end includes a valve housing and an amplifier piston which is slidably received in the housing only along that end portion which is oriented towards the input end. The other terminal length portion of the amplifier piston which is oriented towards the ouput end continuously projects from the valve housing and carries a pressure conduit nipple and a return conduit nipple. The valve housing is a sheet metal construction formed of a plurality of interconnected elements. This housing includes an outer, rotationally symmetrical, generally cup-shaped sheet metal housing shell and a sheet metal inner cylinder sleeve which extends inside the housing shell coaxially therewith and at a radial distance therefrom, approximately over the entire length of the housing shell. The input-side end of the cylinder sleeve is connected to the housing shell in such a manner that an annular space, which is hermetically sealed towards the input end, is defined between the housing shell and the cylinder sleeve. The amplifier piston has a tubular portion which is open towards the input end and which is slidably received in the annular space.

9 Claims, 3 Drawing Figures

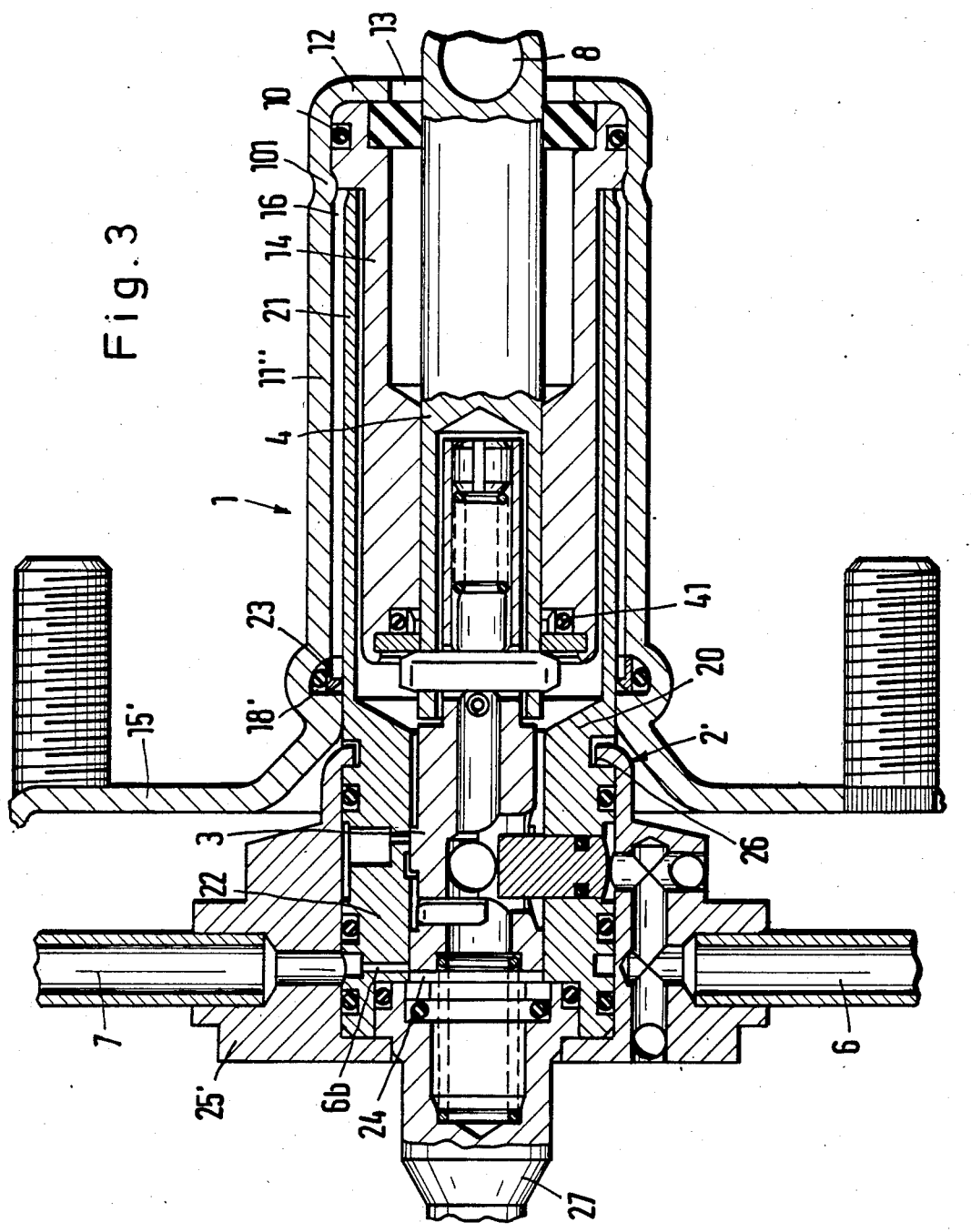

HYDRAULIC AMPLIFIER VALVE ASSEMBLY

BACKGROUND OF THE INVENTION

1. Field Of The Invention

This invention relates to a hydraulic amplifier valve assembly, particularly for a hydraulic brake system in automotive vehicles and is of the type which has a valve housing receiving an axially displaceable amplifier piston and a control plunger displaceably disposed in an axial passage of the amplifier piston. The control plunger is axially displaceable by a reaction piston which is coupled to a brake pedal arrangement and which is guided in the valve housing and sealed by means of a sole ring seal. The amplifier piston projects into the valve housing only with its pedal-side end portion and is sealed relative to the wall of the valve housing by a sole ring seal situated at the entrance of the valve housing. Coupling nipples for a pressure conduit and for a return conduit are arranged in that portion of the amplifier piston which projects at all times from the valve housing.

2. Description Of The Prior Art

A hydraulic amplifier valve assembly as outlined above is disclosed, for example, in German Patent No. 3,037,218.

The greater the number of seals between the axially relatively movable components of a hydraulic amplifier valve assembly, the greater the friction, particularly if the seals are continuously under pressure and are designed for high pressure stresses. Such friction is particularly disadvantageous in case the hydraulic amplifier valve assembly is, by virtue of its asymmetrically arranged control ports, a pressure-unbalanced valve assembly, because the friction in such amplifier valve assemblies is greater than in pressure-balanced amplifier valve assemblies due to the radial displaceability of the control plunger within the amplifier piston. Such pressure-unbalanced amplifier valve assemblies are disclosed, for example, in U.S. Pat. Nos. 4,379,423 and 4,516,470.

Particularly for the purpose of reducing the above-noted friction, German Patent No. 3,037,218 discloses a hydraulic amplifier valve assembly in which the amplifier piston is not surrounded along its entire length by the valve housing in the usual manner, but is surrounded solely about that end portion thereof into which the control plunger is introduced and wherein only a single ring seal exposed to high pressure is provided between the valve housing and the amplifier piston. The conduit coupling nipples for conduits leading to a hydraulic pressure source and to a non-pressurized reservoir are arranged in that part of the amplifier piston which projects from the valve housing. Upon actuation of the brake these conduits are to be shifted axially together with the amplifier piston and should therefore be axially deflectable (for example, flexible).

SUMMARY OF THE INVENTION

It is an object of the invention to provide an improved hydraulic amplifier valve assembly of the above-outlined type, which may be manufactured in a simpler and less expensive manner and whose spatial requirements in the axial direction are significantly reduced, while preserving the functional advantages thereof.

These objects and others to become apparent as the specification progresses, are accomplished by the invention, according to which, briefly stated, the hydraulic amplifier valve assembly having a force input end (where, for example, a brake pedal force may be applied) and an output end (which delivers an amplified force, for example, to a master cylinder of a brake system) includes a valve housing and an amplifier piston which is slidably received in the housing only along that end portion which is oriented towards the input end. The other terminal length portion of the amplifier piston which is oriented towards the output end continuously projects from the valve housing and carries a pressure conduit nipple and a return conduit nipple. The valve housing is essentially a sheet metal construction formed of a plurality of interconnected elements. Thus, the housing includes an outer, rotationally symmetrical, generally cup-shaped sheet metal housing shell and a sheet metal inner cylinder sleeve which extends inside the housing shell coaxially therewith and at a radial distance therefrom, approximately over the entire length of the housing shell. The input-side end of the cylinder sleeve is connnected to the housing shell in such a manner that an annular space, which is hermetically sealed towards the input end, is defined between the housing shell and the cylinder sleeve. The amplifier piston has a tubular portion which is open towards the input end and which is slidably received in the annular space.

Thus, according to the invention, the valve housing of the high-pressure hydraulic valve assembly is not - as has been the conventional practice - a cast component which requires significant machining but is essentially a sheet metal construction assembled from a plurality of individual elements, particularly drawn sheet metal parts which, in turn, may be shaped optimally in a simple manner. In particular, the valve housing according to the invention is subdivided into a rotationally symmetrical outer, cup-shaped housing shell and a coaxial inner cylinder sleeve radially spaced from the housing shell. The ring seal for the reaction piston is situated at that free end of the cylinder sleeve which is oriented away from the cup bottom and is approximately at the same axial height as the ring seal for the amplifier piston. It may be thus said that the valve housing is "turned outside in" (or "reversed inwardly"). By means of such a constructional design of the valve housing the required axial structural space (that is, the distance between the pedal-side end of the reaction piston and the free end of a push rod which is affixed to the amplifier piston and which is connectable, for example, to the piston rod of a master cylinder in a brake system) may be reduced by 30 to 50% as compared to known amplifier valve assemblies.

BRIEF DESCRIPTION OF THE DRAWINGS

FIG. 3 is an axial sectional view of a third preferred embodiment of the invention.

DESCRIPTION OF THE PREFERRED EMBODIMENTS

Each Figure illustrates a pressure-unbalanced hydraulic amplifier valve assembly which may find application, for example, in a hydraulic brake system of an automotive vehicle. It is to be understood however, that the invention may be practiced in connection with balanced hydraulic amplifier valve assemblies as well.

It is further to be understood that the invention is not concerned with the mode of operation (amplification and its control) of the valve assembly; in this connection reference is made to the earlier-identified prior art.

Figure 1:
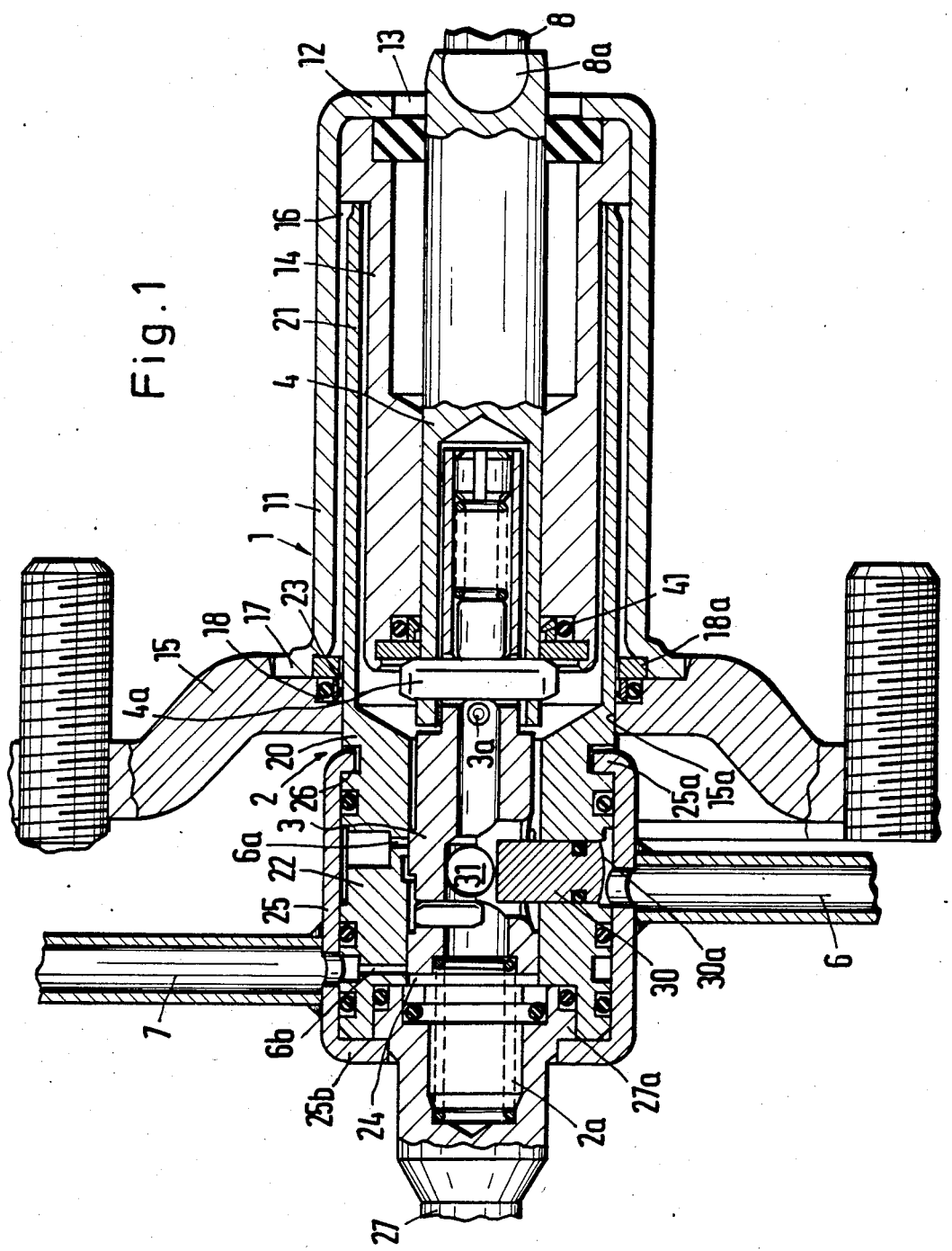
FIG. 1 is an axial sectional view of a first preferred embodiment of the invention.

Turning to FIG. 1, the hydraulic amplifier valve assembly illustrated therein is formed in essence of a valve housing 1, an amplifier piston 2 axially displaceable therein as well as a control plunger 3 which is supported in a blind bore-like axial passage 24 of the amplifier piston 2. The control plunger 3 may be axially displaced toward the left by a force applied at its right-hand end (force input end) and derived from a brake pedal assembly (not shown), against the force of a pressing spring 2a situated between the amplifier piston 2 and the control plunger 3. The pedal force of the pedal assembly is transmitted by means of a pressing piston constituted by a reaction piston 4 which is axially slidably supported within the valve housing 1 and which is coupled with the pedal-side free end of the control plunger 3 by means of two mutually transversely arranged pins 3a and 4a, being solely in a point-like contact with one another. The pin 3a is carried by the control plunger 3, while the pin 4a is carried by the reaction piston 4. The connection between the pedal arrangement and the reaction piston 4 is effected by an only symbolically shown push rod 8 which is connected to the reaction piston 4 by means of a ball joint 8a.

The control plunger 3 and the amplifier piston 2 constitute a pressure-unbalanced unit known by itself, having large-tolerance fits which permit a certain radial displacement of the control plunger 3 within the amplifier piston 2. Such radial displaceability is small relative to the length of the axial displacement path of the shifting components. Control ports 6a and 6b which, dependent upon the axial position of the control plunger 3 relative to the amplifier piston 2, operatively couple the valve assembly to a pressure conduit nipple 6 and a return conduit nipple 7, respectively, are circumferentially and asymmetrically arranged in the amplifier piston 2. The control plunger 3 is supported in the amplifier piston 2 in a known manner without the use of axial ring seals on either side of the control ports 6a, 6b, so that a particularly low-friction and easily sliding arrangement is obtained. In order to ensure nevertheless a highly hermetic seal of control ports in the closed state thereof, there is provided a transverse piston 30 whose outer face 30a is continuously exposed to the system pressure of the pressure source and which is radially displaceably supported in the wall of the amplifier piston 2. The transverse piston 30 displaces, with the intermediary of a ball 31, the control plunger 3 radially mechanically in such a manner that it is pressed in the zone of the control ports 6a, 6b against an inner wall face portion of the amplifier piston 2, so that upon a relative displacement of the control plunger 3 with respect to the amplifier piston 2, that is, when the control port 6a, 6b is just closed, the radial pressing of the control plunger 3 achieves a reliable, highly hermetic seal.

As a further measure to maintain the friction small, the amplifier piston 2 projects into the valve housing 1 only along its pedal-side end portion (input end) which, in the position shown in FIG. 1, corresponds approximately to one half of the total axial length of the amplifier piston 2. Between the valve housing 1 and the amplifier piston 2 there is provided a sole high-pressure ring seal 23 which is situated at the entrance of the valve housing 1. The pressure conduit nipple 6 and the return conduit nipple 7 are arranged at those portions of the amplifier piston 2 which at all times freely project from the valve housing 1. Upon actuation of the brake, the nipples 6, 7 travel with the amplifier piston 2 as a unit and consequently, the pressure conduit (not shown and leading to a pressure source) coupled to the nipple 6 and the return conduit (also not shown and leading to a reservoir) coupled to the nipple 7 need to be deflectable (for example, flexible) components.

The valve housing 1 is essentially a sheet metal structure and is assembled from a plurality of individual elements which are preferably drawn sheet metal components. In essence, the valve housing 1 comprises a sheet metal, rotationally symmetrical, generally cup-shaped outer housing shell 11 and a sheet metal cylinder sleeve 14 which is arranged coaxially within and at a radial distance from, the housing shell 11 and which extends at least approximately over the entire length of the housing shell 11. The pedal-side end of the cylinder sleeve 14 is connected with the pedal-side radial end wall 12 of the housing shell 11 in such a manner that between the outer surface of the cylinder sleeve 14 and the inner surface of the housing shell 11 an annular space 16 is formed which is hermetically closed towards the pedal-side end. Thus, it may be said that the valve housing 1 (that is, the components 11 and 14 viewed together) is "turned outside in", or, stated differently, one housing half (the cylinder sleeve 14) is turned around 180° and telescoped into the other housing half (the housing shell 11).

By virtue of the above-explained "inversion" of the valve housing 1 the annular seal 41 of the reaction piston 4 may be arranged in the free end portion of the cylinder sleeve 14 at least approximately of the same axial height as the ring seal 23 of the amplifier piston 2. In this manner, a particularly compact axial construction is obtained.

The pedal-side end portion of the amplifier piston 2 is a cylinder tube 21 which is open towards the pedal side and projects into the annular chamber 16 defined between the outer housing shell 11 and the inner cylinder sleeve 14.

The outer housing shell 11 is, at its end oriented towards the projecting part of the amplifier piston 2, connected with a securing flange 15 which, compared to the housing shell 11, is a thick walled, separate sheet metal part to which the housing shell 11 is joined in a hermetic manner with a radially outwardly flaring end 17. Similarly to the connection between the inner cylinder sleeve 14 and the pedal-side end (input end) of the housing shell 11, the last-named connection between the housing shell 11 and the securing flange 15 may be effected, for example, by means of laser welding. The securing flange has a central aperture 15a through which the amplifier piston 2 passes.

The annular seal 23 arranged at the entrance of the valve housing 1 for cooperating with the amplifier piston 2, is disposed in a circumferential radial recess 18 of the securing flange 15. The recess 18 is advantageously stepped to provide a nest for the radially outwardly flaring end 17 of the housing shell 11. The stepped recess 18 may be provided in the flange 15 by machining on a lathe. A sheet metal ring 18a is inserted into the stepped recess 18 radially inwardly of the flaring end 17 in order to provide a defined sharp-edged pedal-side groove wall between the recess 18 and the housing shell 11.

In order to ensure the necessary pivotal range for the push rod 8 of the pedal assembly joined to the reaction piston 4, the radial end wall 12 of the housing shell 11 is provided with a wide aperture 13 through which the pedal-side end of the reaction piston 4 passes and further, the hollow of the inner cylinder sleeve 14 is stepped, having a portion of a larger diameter on the pedal side and a portion of a smaller diameter on the opposite side. The reaction piston 4 is slidably supported in the bore portion having the smaller diameter.

The amplifier piston 2 has a cylindrical base body 20 having a constant outer diameter along its length (apart from the provision of annular grooves) and an external cover sleeve 25 on which the nipples 6 and 7 are mounted. The cover sleeve 25 surrounds an amplifier piston portion 22 which forms a part of the base body 20 and which at all times projects from the valve housing 1. The cover sleeve 25 is connected with the amplifier piston portion 22 in a form-fitting manner. The pedal-side end 25a of the cover sleeve 25 is radially inwardly pressed or rolled into an annular groove 26 provided in the base body 20. The cover sleeve 25 is also used to secure a push rod 27 to the base body 20 of the amplifier piston 2. For this purpose, the push rod-side end 25b of the cover sleeve 25 extends radially inwardly and lockingly projects behind a shoulder 27a of the push rod 27. The push rod 27 closes outwardly the axial bore 24 of the amplifier piston 2 and serves for transmitting the axial displacement of the amplifier piston 2 to, for example, a hydraulic master cylinder (not shown) of a hydraulic brake system for an automotive vehicle. Thus, the left end of the amplifier piston 2 (as viewed in FIG. 1) constitutes the force output end of the amplifier valve assembly.

By virtue of the fact that the push rod 27 is secured to the amplifier piston 2 by means of the cover sleeve 25, the conventionally required press fit (as provided, for example, in the construction according to German Patent No. 3,037,218) between the push rod 27 and the amplifier piston 2 may be dispensed with. This eliminates risks that upon securing the push rod 27 to the amplifier piston 2, the spatial alignment of the control port 6b provided in the end zone of the amplifier piston 2 is adversely affected. It will be understood that when a press fit is used, the amplifier piston is necessarily somewhat flared in the end zone so that a certain change of position of, for example, the control port 6b cannot be excluded securely. For this reason, in the known arrangements the control ports are provided in a separate sleeve which is not affected by the press fit between the push rod and the amplifier piston.

A further manufacturing advantage of the invention resides in the fact that the cylindrical base body 20 has, except for circumferential grooves, a constant outer diameter along its entire length so that it may be machined to the desired dimensions in a single, simple operational step on a conventional machine tool. The amplifier piston seal 23 at the entrance of the valve housing 1 requires a highly polished cooperating surface of the pedal-side end portion 21 of the amplifier piston 2. Such surface may be produced in the most rapid and most economic manner in a continuous process which presupposes a cylindrical configuration. In the known cast valve housings involving integral, formed-on nipples for the hydraulic pressure and return conduits, such as disclosed in German Patent No. 3,037,218, the highly polished upper face of the amplifier piston has to be provided in other, more complex and expensive processes.

Figure 2:
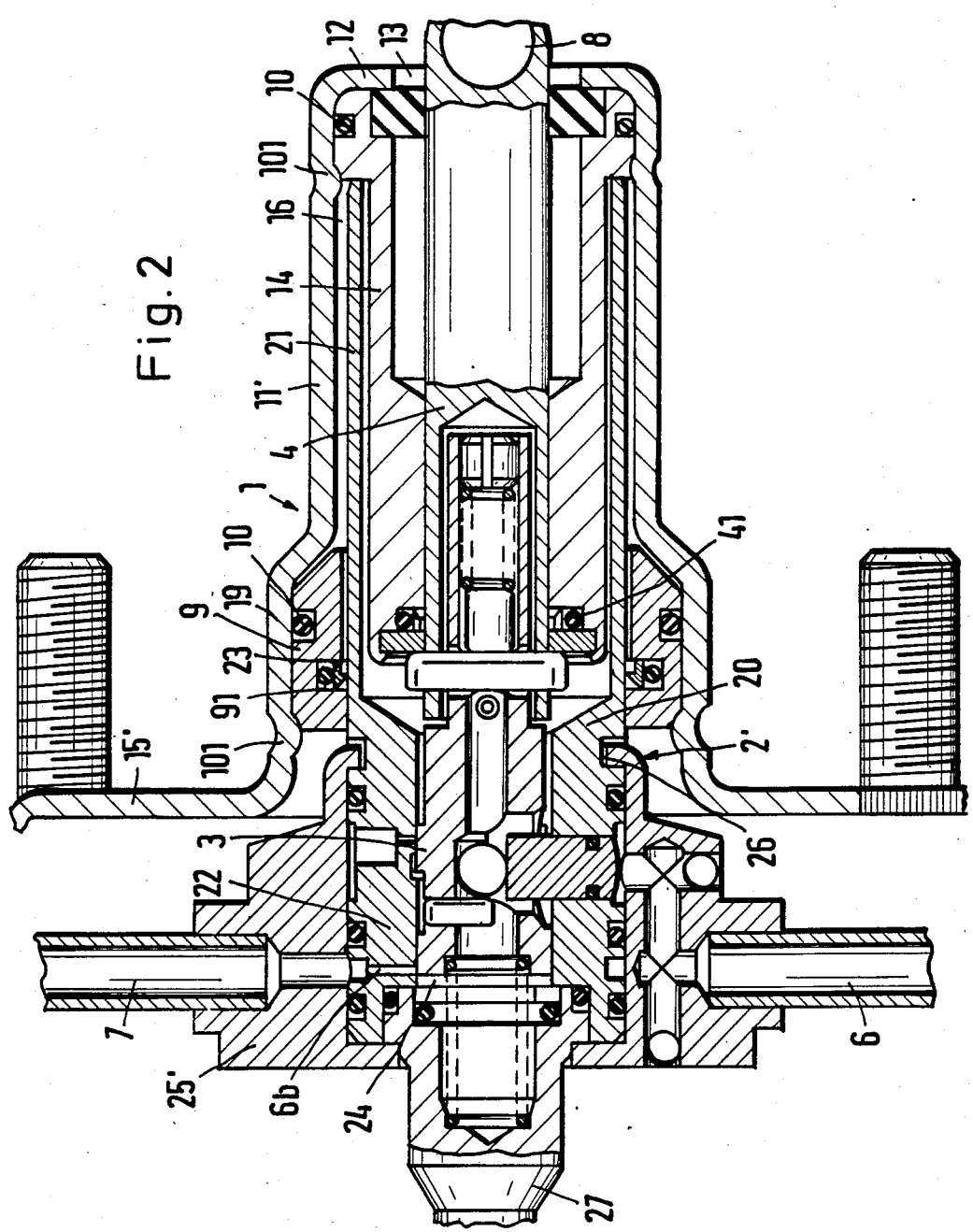
FIG. 2 is an axial sectional view of a second preferred embodiment of the invention.

Turning now to the embodiments shown in FIGS. 2 and 3, a securing flange 15' is an integral, one-piece part of the drawn sheet metal housing shell 11', 11'', respectively, rather than being a separate component as shown at 15 in the FIG. 1 embodiment. In the embodiment according to FIG. 2, the housing shell 11' has an increased diameter in its end zone 19 adjacent the flange 15'. Into the enlarged portion 19 there is inserted a rotationally symmetrical bearing part 9 which is preferably machined on a lathe and in which the pedal-end terminal part 21 of the amplifier piston 2 is supported. The ring seal 23 cooperating with the amplifier piston 2 is received in an annular groove 91 provided in the bearing part 9. In principle, the bearing part 9 may be hermetically connected with the housing shell 11' in an arbitrary manner. From the point of view of manufacturing technology, it is advantageous, however, to use for this purpose a circumferential ring seal 10, preferably an O-ring, which is pressed into the housing shell 11' and is axially fixed by a radially, inwardly extending embossment 101 which may be constituted by a plurality of circumferentially spaced dot-like depressions or a single continuous circumferential bead. The connection between the outer housing shell 11' and the inner cylinder sleeve 14 may be effected in a similar manner.

Turning once again to FIG. 3, particularly in case the hydraulic amplifier valve assembly is operated with low working pressures, it is feasible to form, for receiving the ring seal for the amplifier piston, an annular groove 18' in that end zone of the housing shell 11'' which is adjacent the flange 15'.

Departing from the embodiment shown in FIG. 1, in the embodiments according to FIGS. 2 and 3, the cover sleeve 25' is not a cylindrical sheet metal part, but a cast component which surrounds that part of the amplifier piston 2' which continuously projects from the valve housing 1. The pedal-side end of the cover sleeve 25' is affixed to the amplifier piston 2' by the radially inwardly extending end of the cover sleeve 25' projecting into a circumferential groove 26 provided in the amplifier piston 2'. Upon using such a cast component the coupling nipples 6 and 7 for the hydraulic pressure and return conduits may be inserted and soldered-on in a particularly simple manner.

The measures according to the invention provide, while preserving the favorable operational and functional properties of conventional structures, for the first time a high-pressure hydraulic amplifier valve assembly of interconnected sheet metal construction resulting in a multi-part housing body in which - compared to the conventional cast components involving complex machining - optimally designed individual elements, particularly drawn sheet metal elements may find application and where, particularly by means of the "inverted" construction of the valve housing as well as by virtue of the arrangement of the reaction piston seal, an axially extremely short unit may be obtained.

It will be understood that the above description of the present invention is susceptible to various modifications, changes and adaptations, and the same are intended to be comprehended within the meaning and range of equivalents of the appended claims.

What is claimed is:

1. In a hydraulic amplifier valve assembly having an input end arranged for exposure to an external pressing force to be amplified and an output end arranged to deliver an amplified force, said assembly including a valve housing; an amplifier piston axially slidably disposed in the valve housing and having an end portion continuously projecting beyond the valve housing towards said output end; a control plunger axially slidably disposed in the amplifier piston; a reaction piston axially slidably disposed in said valve housing and having a first end force-transmittingly connected to said control plunger and an opposite, second end for directly receiving said external pressing force; ports provided in said amplifier piston and arranged for being controlled by said control plunger; a pressure conduit coupling nipple and a return conduit coupling nipple carried by said end portion of said amplifier piston and arranged for maintaining communication with said ports; the improvement comprising (a) a sheet metal, rotationally symmetrical, elongated, cup-shaped housing shell having an axis and an end wall at said input end and an open end oriented towards said output end; said end wall having an aperture traversed by said reaction piston with a substantial clearance; said housing shell forming part of said valve housing;

(b) a sheet metal inner cylinder sleeve extending coaxially within said housing shell and having an axial length substantially equalling that of said housing shell; said inner cylinder sleeve being affixed to said housing shell at said end wall thereof and being radially spaced therefrom for defining therewith an annular space extending substantially along the axial length of said cylinder sleeve and being hermetically sealed towards said input end; said reaction piston being axially slidably received in said cylinder sleeve; said cylinder sleeve forming part of said valve housing;

(c) a securing flange surrounding said housing shell and being affixed thereto at said open end thereof;

(d) a cylinder tube forming an integral part of said amplifier piston and having an open end oriented towards said input end; said cylinder tube being axially slidably received in said annular space;

(e) a first seal sealingly surrounding said cylinder tube of said amplifier piston and being stationarily situated in a zone of said open end of said housing shell; and (f) a second seal sealingly surrounding said reaction piston and being stationarily situated at least approximately at a same axial height as said first seal.

2. A hydraulic amplifier valve assembly as defined in claim 1, wherein said securing flange is a drawn sheet metal component separate from said housing shell and has a wall thickness greater than that of said housing shell; further wherein said housing shell has, at the open end thereof, a radially outwardly flaring end hermetically affixed to said securing flange; said securing flange having a central aperture aligned with the open end of said housing shell and traversed by said amplifier piston and a circumferential groove surrounding said aperture and receiving said first seal.

3. A hydraulic amplifier valve assembly as defined in claim 1, wherein said housing shell is a drawn sheet metal member and further wherein said securing flange constitutes an integral part of said housing shell; said housing shell having, adjacent said securing flange, a length portion of enlarged diameter; further comprising a rotationally symmetrical, axially hollow bearing member seated in said length portion of enlarged diameter and traversed by said cylinder tube of said amplifier piston; said bearing member slidably supporting said cylinder tube; and an inner circumferential groove provided in said bearing member and receiving said first seal.

4. A hydraulic amplifier valve assembly as defined in claim 3, wherein said cylinder sleeve and said bearing member are press-fitted in said housing shell with an interposition of annular seals; further comprising radially inwardly directed circumferential embossments in said housing shell for axially immobilizing therein said bearing member and said cylinder sleeve.

5. A hydraulic amplifier valve assembly as defined in claim 1, wherein said housing shell is a drawn sheet metal member and further wherein said securing flange constitutes an integral part of said housing shell; said housing shell having, adjacent said securing flange, an inner circumferential groove receiving said first seal.

6. A hydraulic amplifier valve assembly as defined in claim 1, wherein said end portion of said amplifier piston continuously projecting beyond the valve housing includes a cylindrical base body having essentially a constant external diameter, a cover sleeve surrounding said base body and mounting means for affixing said cover sleeve to said base body; said coupling nipples being attached to said cover sleeve.

7. A hydraulic amplifier valve assembly as defined in claim 6, wherein said mounting means comprises an external circumferential groove provided in said base body and an end portion forming part of said cover sleeve and being received in said external circumferential groove.

8. A hydraulic amplifier valve assembly as defined in claim 1, wherein said housing shell is a drawn sheet metal member.

9. A hydraulic amplifier valve assembly as defined in claim 1, wherein said cylinder sleeve is a drawn sheet metal member.

* * * * *